L. BAXTER.
HYDROCARBON LANTERN.
APPLICATION FILED APR. 2, 1915.

1,155,464.

Patented Oct. 5, 1915.

Witnesses
George H. Snyder
Vern F. Deeter

Inventor
Leonidas Baxter

By
Howard D. Smith,
Attorney

UNITED STATES PATENT OFFICE.

LEONIDAS BAXTER, OF DAYTON, OHIO, ASSIGNOR TO THE THOMAS MANUFACTURING COMPANY, OF DAYTON, OHIO, A CORPORATION OF OHIO.

HYDROCARBON-LANTERN.

1,155,464.

Specification of Letters Patent.

Patented Oct. 5, 1915.

Application filed April 2, 1915. Serial No. 18,672.

*To all whom it may concern:*

Be it known that I, LEONIDAS BAXTER, a citizen of the United States, residing at Dayton, in the county of Montgomery and State of Ohio, have invented new and useful Improvements in Hydrocarbon-Lanterns, of which the following is a specification.

This invention relates to new and useful improvements in hydrocarbon lanterns.

The object of my invention is to provide a compact, efficient and well-appearing hydrocarbon lantern in which the hydrocarbon fluid is forced to the burners by the pressure of air, from a suitable containing reservoir.

The marked features of improvement to which the efficiency and other desirable qualities of the lantern are due, will be fully described in the following specification and particularly pointed out in the subjoined claims.

The preferred form of embodiment of my invention is illustrated in the accompanying drawings, of which—

Figure 1:
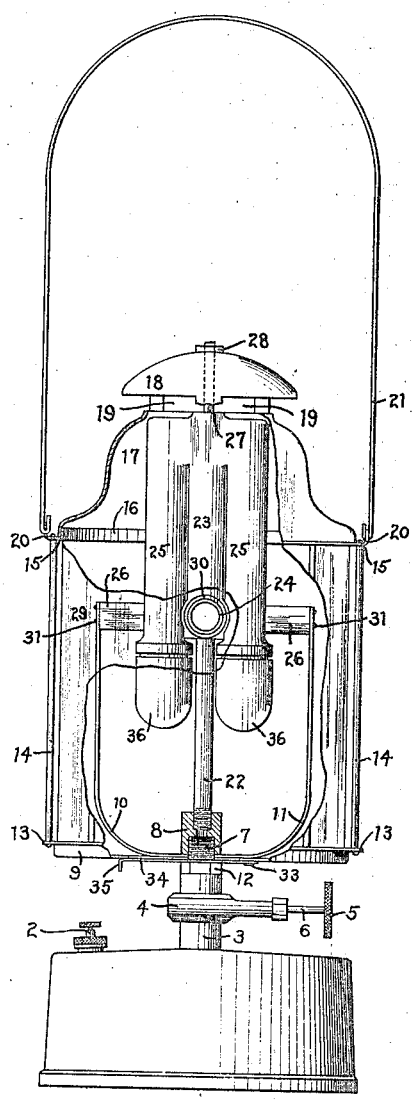
Figure 2:
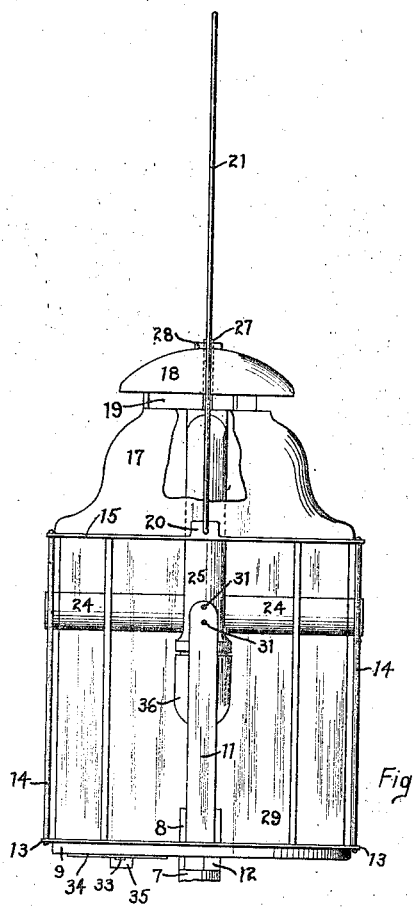
Figure 3:
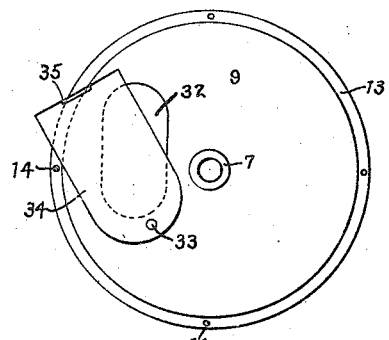

Figure 1 is a front elevational view of the lantern, with the casing partly broken away to reveal the burner parts. Fig. 2 is a side elevational view, partly broken away, of the upper portion of the lantern. And Fig. 3 is a bottom plan view of the base of the upper portion of the lantern.

Throughout the specification and drawings, similar reference characters denote corresponding parts.

In a detailed description of the preferred form of embodiment of my invention, the numeral 1 designates a chamber or reservoir adapted to contain kerosene or other hydrocarbon fluid. Provided on the top of the chamber 1 is an air-inlet valve 2 suitable for connection to any common form of air-pressure pump by which air may be compressed above the fluid in the reservoir 1. Mounted upon, and communicating with the reservoir 1, is a short tubular standard 3 to which is secured a valve casing 4 for any suitable form of valve which may be controlled by a hand wheel 5 attached to a valve stem 6. Adapted to receive the upper threaded end of the valve casing 4, is the lower contracted end of a connecting tube 7, the upper threaded end of which enters a sleeve or coupling 8. The connecting tube 7 also passes through a base pan 9 which, together with the lower ends of two supporting members 10 and 11 through which the tube 7 also extends, are tightly compressed between a hexagon portion 12 on the upper end of said tube, and the coupling 8. The base pan 9 is provided with an annular horizontally disposed rim or flange 13 to which is secured, at equal distances apart, a plurality of upwardly extending rods 14 which support an annular rim 15 having an upturned flange portion 16. Removably mounted on the rim 15 is a dome 17 having a raised hood 18 to provide between the latter and the dome, ventilating apertures 19. Suitably secured opposite each other, to the rim 15, are two upturned ears 20 which loosely receive, through apertures provided therein, the hook ends of a bail 21 by means of which the lantern may be readily carried from place to place.

Threaded into the upper end of the coupling 8, is a vaporizing tube 22 which is connected to, and supports a single casting preferably made of aluminum and comprising a mixing tube 23, air-inlet tube 24, depending burner tubes 25 and bracing arms 26. Projecting upwardly from the top of said casting, is a rod 27 whose upper threaded end loosely passes through an aperture in the top of the hood 18 to receive a nut 28 by means of which the dome 17 is held firmly upon the annular rim 15. By removing the nut 28, the dome 17 may be readily lifted from the rim 15, to permit the burner parts to be easily cleaned and new mantles applied.

Fitted tightly within the annular rim 15, and extending downwardly between the upright rods 14 to the base pan 9 upon which it rests, is a transparent globe 29. This globe is preferably constructed cylindrical in form, and may be made of glass or other transparent material.

In order to insure a supply of pure air for the mixing chamber, the air-inlet tube 24 is so constructed that each end thereof will project through and beyond a large circular aperture 30 provided in each side of the globe 29. This, therefore, brings the openings in said tube beyond the globe, whereby pure air from the outside may be drawn into the mixing chamber at all times.

For the purpose of properly bracing the burner parts within the lantern casing, the supporting members 10 and 11 heretofore mentioned, are provided. The tube 7 passes through the lower ends of these members as hereinbefore described, whence they are turned upwardly and secured, by means of screws 31, to their respective ends of the arms 26. As their lower ends are firmly compressed between the base pan 9 and the coupling 8 in the manner hereinbefore described, they will form a firm support for the burner parts to which they are connected through the arms 26.

Referring to Figs. 2 and 3, it will be observed that an opening 32 has been formed in the base pan 9. Pivotally secured to a large-headed pin 33 attached to said base pan near one edge of the opening 32, is a cover plate 34 which may be moved to open and close said opening by means of an upturned edge 35. Through this opening the mantles 36, which depend from the burner tubes 25, may be easily ignited without the necessity of removing the dome 17.

From the foregoing it will be observed that I have provided a simple and efficient hydrocarbon lantern which produces a white light of constant power and great brilliancy.

Having described my invention, I claim:

1. In a hydrocarbon lantern, a fluid reservoir, a tubular standard mounted thereon, a lantern frame, a base for said frame, a tubular member extending upwardly from said standard and through said base, a coupling removably secured to the upper end of said tubular member, hydrocarbon burner means secured to said coupling and communicating therethrough with the tubular member, and a shoulder on the lower end of the latter, between which and the coupling the base is clamped, substantially as described.

2. In a hydrocarbon lantern, a fluid reservoir, a tubular standard mounted thereon, a lantern frame, a base for said frame, a threaded tubular member extending upwardly from said standard and through said base, a sleeve supported by the upper threaded end of said tubular member, a vaporizing tube extending upwardly from said sleeve, hydrocarbon burner means supported upon said tube, and a shoulder on the lower end of the tubular member, between which and the sleeve the base is clamped, substantially as described.

3. In a hydrocarbon lantern, a fluid reservoir, a tubular standard mounted thereon, a lantern frame, a base for said frame, a sleeve, a vaporizing tube extending upwardly from said sleeve, a mixing tube supported upon the vaporizing tube, a burner tube extending downwardly on each side of said mixing tube, arms extending outwardly from the lower portions of said burner tubes, a tubular member extending from said sleeve, through said base into the tubular standard, supporting members attached to said arms through the lower ends of which said tubular member also passes, said tubular member being threaded, and a shoulder on the latter below said base, to compress the lower ends of said supporting members between the base and said coupling, whereby said members may form a firm bracing support for the mixing and burner tubes, substantially as described.

In testimony whereof I have hereunto set my hand this 30th day of March, 1915.

LEONIDAS BAXTER.

Witnesses:
HOWARD S. SMITH,
CHAS. D. HEALD.